United States Patent [19]

Meckler

[11] 4,290,273

[45] Sep. 22, 1981

[54] PELTIER EFFECT ABSORPTION CHILLER-HEAT PUMP SYSTEM

[76] Inventor: Milton Meckler, 16348 Tupper St., Sepulveda, Calif. 91348

[21] Appl. No.: 121,249

[22] Filed: Feb. 13, 1980

[51] Int. Cl.³ .................. F25B 15/00; F25B 21/02
[52] U.S. Cl. ........................... 62/148; 62/3; 62/476; 62/483
[58] Field of Search .................. 62/148, 476, 483, 3

[56] References Cited

U.S. PATENT DOCUMENTS

| | | | |
|---|---|---|---|
| Re. 21,894 | 9/1941 | Randel | 62/483 X |
| 1,870,265 | 8/1932 | Seligmann | 62/483 X |
| 2,446,988 | 8/1948 | Flukes et al. | 62/483 |
| 2,959,017 | 11/1960 | Gilman et al. | 62/3 |
| 3,402,570 | 9/1968 | Schlichtig | 62/483 |
| 3,440,832 | 4/1969 | Aronson | 62/476 X |
| 3,597,936 | 8/1971 | Dyre et al. | 62/476 X |
| 3,626,716 | 12/1971 | Leonard, Jr. | 62/476 X |
| 3,640,084 | 2/1972 | Hopkins et al. | 62/476 X |
| 3,717,007 | 2/1973 | Kuhlenschmidt | 62/476 |
| 4,207,751 | 6/1980 | Kampfenkel et al. | 62/476 X |

*Primary Examiner*—Lloyd L. King
*Attorney, Agent, or Firm*—William H. Maxwell

[57] ABSTRACT

A chiller and heat pump system employing the Peltier effect in a diffusion still combined with a steam-jet refrigeration unit associated with a condenser and with an evaporator absorption unit, and associated pump means and valve control means for multi mode operation including; simultaneous low temperature heating and cooling, cooling, heating, and simultaneous high temperature heating and cooling.

20 Claims, 4 Drawing Figures

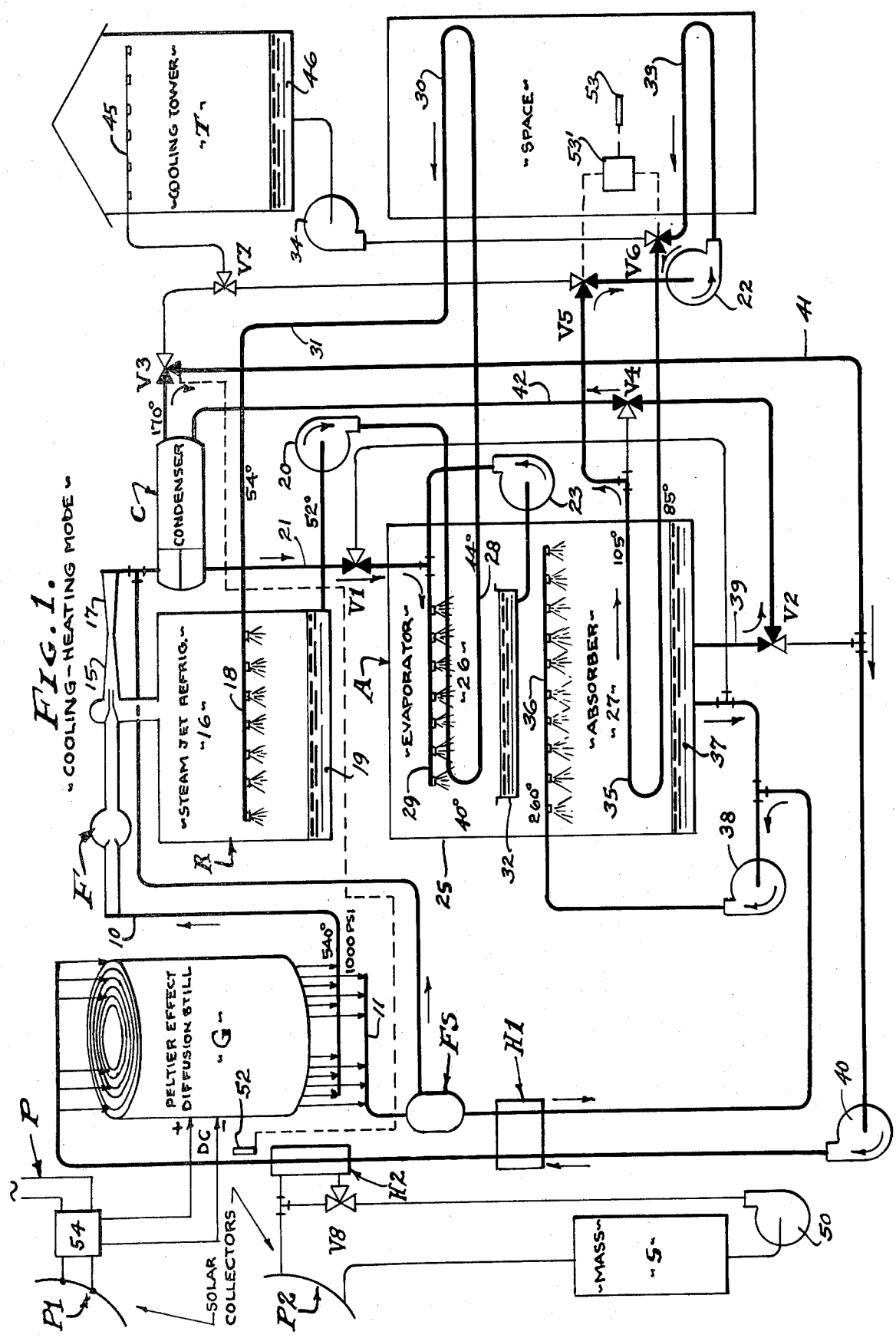

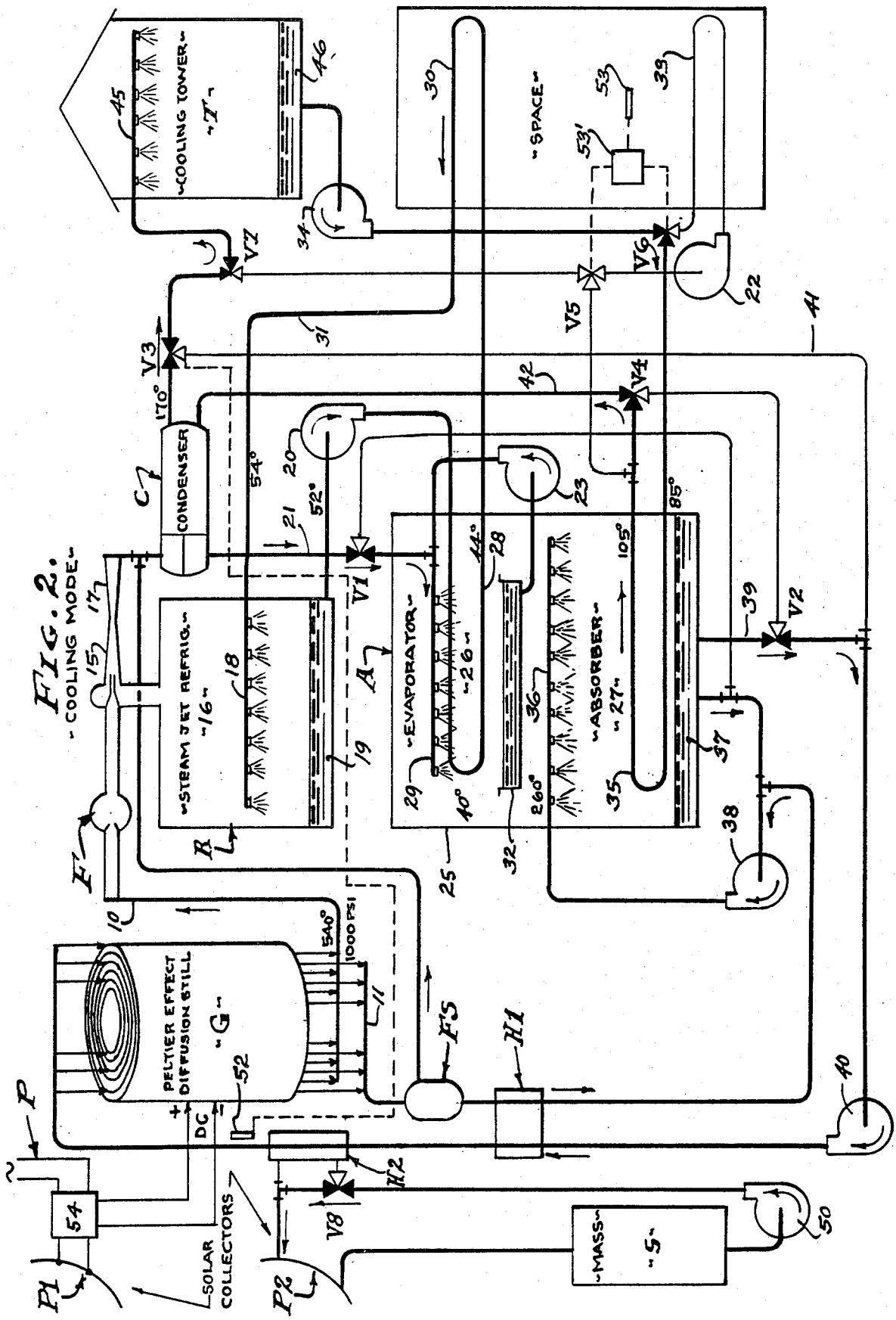

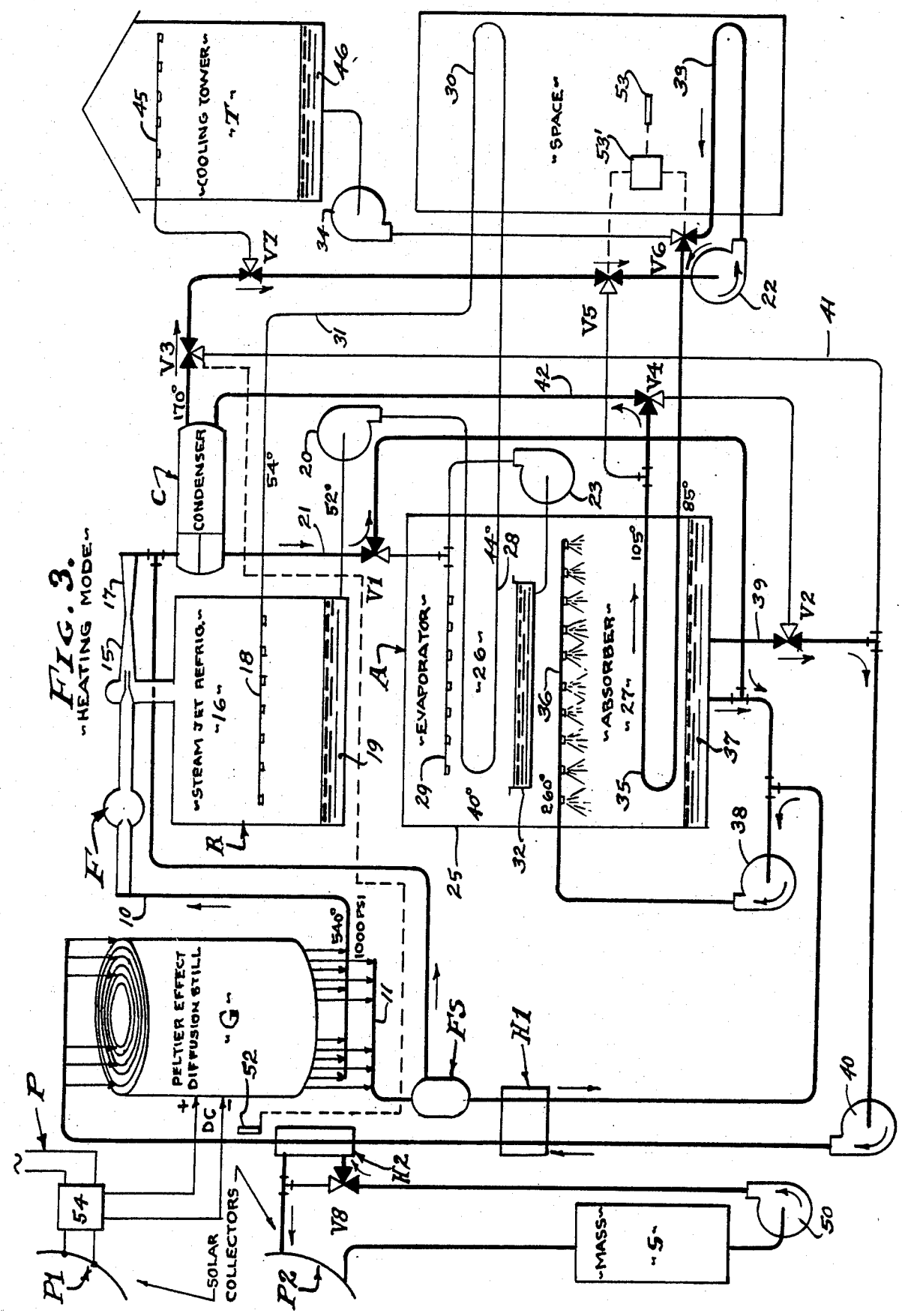

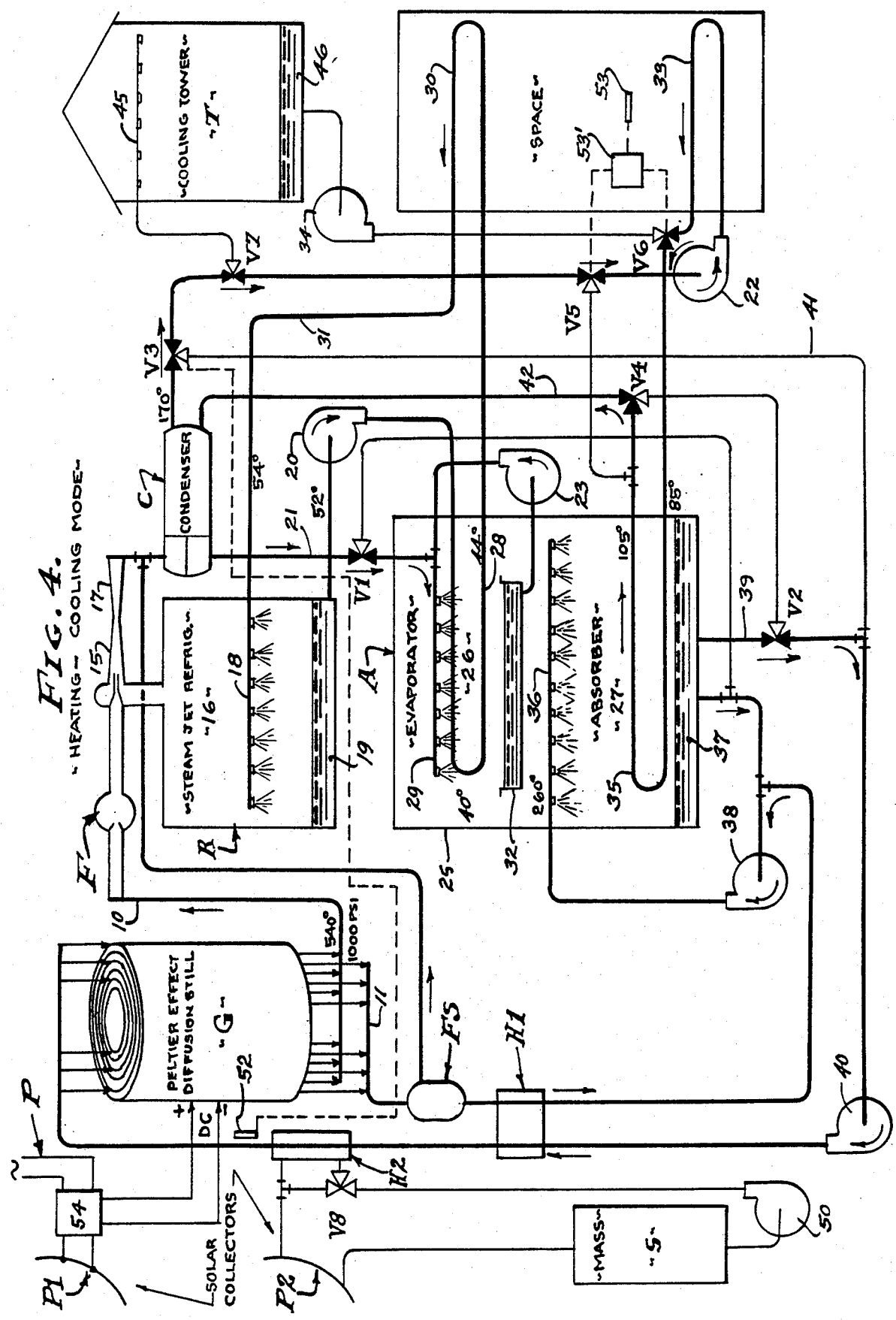

PELTIER EFFECT ABSORPTION CHILLER-HEAT PUMP SYSTEM

BACKGROUND

This invention relates to the conditioning of space in building structures and the like, and specifically to both cooling and heating thereof. The system disclosed herein is a heat pump that advantageously employs a Peltier Effect Diffusion Still (PEDS) in combination with a Steam-Jet Refrigeration Unit, a Condenser, and an Evaporation-Absorber Unit. These components are associated in a system or apparatus put into operation primarily by the application of electrical energy and assisted by the application of solar energy or other available waste heat in engine exhaust; with circulation pumps and control valves for the general object of providing a multi-purpose Chiller-Heat Pump having selective modes of operation, namely; (1) Simultaneous Low Temperature Heating and Cooling; (2) Cooling; (3) Heating; and (4) Simultaneous High Temperature Heating and Cooling. A cooling tower is employed in the cooling mode, and heat exchangers apply heat to a weak absorbent from the strong absorbent as the refrigerant is fed to and emitted from the PEDS. In practice, water is the refrigerant and calcium chloride, or lithium bromide or the like is the absorbent.

The generator means G or absorbent concentrator employed herein is a Peltier Effect Diffusion Still or PEDS, an electrically operated regenerator that drives water from the absorbent in solution therewith. In general terms the generator is a thermoelectric still which includes a series of concentric endless walled sections which sections are closely spaced and between which a series of thermoelectric elements are positioned as heat pumps. Means are provided for the passage of distillate along the radially outer surface of each of the concentric sections. Water vapor is diffused from the thin film of liquid passing along the outer surface of each section, across a narrow gap or endless space to the inner surface of the next adjacent concentric section which serves as a condensing surface. The heat for the diffusion of the water vapor at a predetermined constant temperature is provided by thermoelectric heat pumping from the first concentric section relative to the axis of the apparatus in series radially outward to the most distant section from the axis. Diffusing water vapor is thus evaporated and condensed respectively from one section to another requiring only the current necessary to pass the heat flux from the inner to the outer surface. Means are provided for removing the distillate from the inner surface of the concentrator sections and the effluent strong absorbent water from the outer surface of the respective concentric sections. Reference is made to the structure of such a Peltier Effect Concentrator Still as it is disclosed in my U.S. Pat. No. 3,393,130 dated July 16, 1968, and in my subsequent U.S. Pat. Nos. 3,671,404 dated June 20, 1972 and 3,801,284 dated Apr. 2, 1974.

In accordance with the present invention, in order to achieve the temperature differential between the evaporating surface and condensing surface of the apparatus, a thermo-electric heat pump is utilized in the form of thermo-electric elements known to the art and described in texts as "Semiconductor Thermo-elements and Thermo-electric Cooling" by A. F. Ioffe, Info Search, Ltd., 1957, and in various patents such as U.S. Pat. No. 2,959,017 Gilman, et al., "Heat Exchangers Employing Thermo-electric Elements for Heat Pumping," issued Nov. 9, 1960, and U.S. Pat. No. 2,978,875, Lackey, et al., "Plural Stage Thermo-Electric Heat Pump" is a device utilizing Peltier phenomenon of heat absorption and heat dissipation at junctions between bodies having different thermomotive properties, which phenomenon occurs when electric current is passed through the bodies. A number of junctions are coupled and generally employed in a heat pump of this type, the couples being physically and electrically interconnected to form a thermo-electric array. A thermo-electric element of the type employed in connection with the present invention typically comprises an N-type thermo-electric element and a P-type thermo-electric element. The N- and P-type components are made from semiconductor materials used in thermo-couples. An example of N-type material is an alloy of bismuth-telluride and bismuth-selenide having a formula of 75% $Bi_2Te_3$-25% $Bi_2Se_3$. An example of P-type material is an alloy of bismuth-telluride and antimony-telluride having the formula 25% of $Bi_2Te_3$-75% $Sb_3Te_3$. Semiconductive components including antimony and bismuth have been found suitable for use respectively as P- and N- type materials. Such materials or the formation of thermo-electric pumping elements are not claimed as novel per se in the present invention, but an example will be set forth of the type of such element employed in connection with the apparatus of the present invention.

The steam jet refrigeration means R employed herein is a fluid pressure apparatus that operates through the application thereto of primary high pressure steam used to energize an ejector that induces a secondary fluid in the form of vapor drawn from an evaporation chamber. The primary motive steam is expanded through a converging-diverging nozzle to velocities of the order of 1200 meters per second (4000 fps.). The corresponding nozzle pressure is very high, and the high velocity steam issuing from the nozzle entrains the water vapor leaving the suction-evaporation chamber, and the two streams merge in a mixing section that converges in the direction of flow. Such an arrangement is diagrammed in the drawings. Warm water return is sprayed into the evaporator chamber and the chilled water is withdrawn therefrom and utilized for space conditioning as shown herein.

The Condenser means C is shown as a conventional surface condenser that extracts heat from the booster ejector exhaust of the aforesaid steam-jet refrigeration means; an essential to operation of said refrigeration system.

The evaporator-absorber means A or absorption chiller-heater employed herein operates to continuously absorb refrigerant vapor from an evaporator, in this instance supplied with chilled water from the aforementioned steam-jet refrigeration means R. Refrigerant liquid is sprayed over the evaporator so as to pick up latent heat as it vaporizes, thereby chilling water circulated within tubes and thus yielding chilled water. Simultaneously, concentrated solution and refrigerant vapor combine in the absorber and form a diluted solution while heat is generated. This absorbing action is cooled by water coming from a cooling tower, or an alternate source as will be described, and leaves to pick up heat from the condenser C and/or the heated conditioned space. Such as chiller-heater is diagrammed in the drawings.

It is an object of this invention to advantageously combine and relate the aforementioned means G,R,C and A with circulation means and control means whereby the aforesaid distinct modes of operation are made possible as circumstances require. Operation of the generator means G is dependent upon a D.C. power supply and made effective by a feed water supply of weak absorbent continuously pumped thereto. Operation of the steam-jet refrigeration means R is dependent upon the high temperature-high pressure output of said generator, and relies upon the condenser means C to reduce temperature and pressure for use in the evaporator absorber means A. And, said means A is interdependent upon the output of each of said means G,R and C, and from the fooling tower T and conditioned space as well. The selected use of the chilled water through the means R and evaporator of the means A, and of the heated water through the absorber of the means A condenser means C is by pump and/or valve means as will be described to controllably determine the modes of operation as may be desired.

SUMMARY OF INVENTION

Peltier effect absorption is conducted in a thermoelectric still that separately discharges high temperature water and strong absorbent liquid. The high pressure water is passed through a flash chamber for conversion to steam and to reduce its temperature and pressure values to those required for the steam-jet refrigeration that follows. The high temperature strong absorbent is passed through a heat exchanger so as to recover heat into the weak absorbent feed to the generator. The steam-jet refrigeration unit separately discharges high temperature steam passed through the condenser means to change its condition to liquid and to transfer heat into a space heating circuit when desired. When in the cooling mode, the condenser heat discharge is passed through the cooling tower. The chilled water is passed through the evaporator section of the chiller-heater means A for a further reduction in temperature and thence through a space cooling circuit when required. The evaporator-absorber means A has a recirculation circuit for the evaporator section thereof and a recirculation circuit for the absorber section thereof, and it has a chilled water circuit to and from the evaporator section and a heated water circuit to and from the absorber section. Weak absorbent feed to the generator means G is from the said absorber section or from the condenser means C.

The foregoing and other various objects and features of this invention will be apparent and fully understood from the following detailed description of the typical preferred forms and applications thereof, throughout which description reference is made to the accompanying drawings.

DESCRIPTION OF THE DRAWINGS

FIGS. 1 through 4 are schematics of the identical apparatus illustrating in heavy lines the active portions thereof for each of the four modes of operation shown; namely the simultaneous low temperature heating and cooling mode in FIG. 1; the cooling mode in FIG. 2; the heating mode in FIG. 3; and the simultaneous high temperature heating and cooling mode in FIG. 4; the unused portions being shown in light lines.

PREFERRED EMBODIMENT

Referring now to the drawings and FIGS. 1 through 4 thereof, each one of the four basic modes of operation is shown with open-active lines heavy and closed-inactive lines light. Arrows indicate the pump operation and direction of flow. Significant (approximate) temperatures and pressures are also indicated, and the mode of operation set forth. It will become apparent that one identical apparatus or system produces any one of the simultaneous or high and low temperature conditioning effects.

The generator means G is a thermo-electric still that utilizes vapor mass transfer in a diffusion process that produces separate discharges of water and strong absorbent refrigerant, both at high to moderate temperature and high to moderate pressure. Thermo-electric principles are employed to cause a fluid to migrate to the cold side of a diffusion gap. The products in the form of water and strong absorbent liquid are removed from the diffusion gap and are discharged separately through lines 10 and 11. The use of thermoelectric elements for heat pumping is well known, involving the phenomenon of heat absorption and heat dissipation at junctions between bodies having different thermo-motive properties, which phenomenon occurs when electric current passes through the bodies. A multiplicity of such junctions are coupled, the couples being physically and electrically interconnected to form an array. A thermoelectric device of this type employed with the present invention comprises an N-type element and a P-type element, both made of a semiconductor material as used in thermocouples. For example, an N-type material such as bismuth-telluride and bismuth-selenide, and a P-type material such as bismuth-telluride and antimony-telluride; designated as P and N to indicate their thermoelectric properties respectively. As shown schematically in the drawings, the generator G is comprised generally of concentric shells connected to positive and negative potentials of a D.C. power source. The shells are arrayed in a pressure vessel (not shown) to channel the distillate water separate from the strong absorbent refrigerant, both at high temperature and high pressure as indicated.

The hot water discharge of the generator means G through line 10 is approximately at 540° F. and at 1000 p.s.i. and which is converted to steam in a flashing means F, in order to be operative in the steam-jet refrigeration means R next to be described. The flashing means F is essentially an expansion chamber wherein the conversion from water to steam occurs with a commensurate pressure and temperature change, and with a discharge of steam at increased velocity.

The strong absorbent refrigerant discharge of the generator means G through line 11 is reduced in temperature and pressure by flashing-separator means FS and the resulting steam discharged therefrom and into the motive steam discharged from the booster-ejector of the steam-jet refrigeration means R.

The steam-jet refrigeration means R is a fluid pressure device that operates according to the flow of steam therethrough at high velocity. The primary motive steam is nozzled into the converging section 15 of a booster ejector, and into which a chilled water vaporization chamber 16 is open. Accordingly, a secondary fluid in the form of vapor is drawn from chamber 16 and into section 15 of the booster ejector, and thereafter discharges through a diverging section 17 of the booster ejector. Thus, the primary motive steam is expanded through the converging-diverging nozzle at high velocity and mixes with the secondary chilled water vapors drawn from chamber 16. The return of chilled water from the conditioned space at approximately 54° F. is sprayed into the chamber 16 by spray means 18 and that which is not evaporated falls or precipitates by gravity into a sump 19 from which it is drawn by a circulation pump 20 as will be described.

The condenser means C is provided to reconvert the steam discharge of the refrigeration means R into water for subsequent evaporation in the evaporator-absorber means A and to supply a heating circuit with heating liquid to be circulated by a pump 22 as will be described. The condenser means C is shown as a conventional surface of surface device wherein the steam gives off its heat and is liquified into water for useful discharge through line 21 under control of a two-position three-way valve V1 that diverts water flow between the upper evaporator section and the lower absorber section of the evaporator-absorber means A as next described.

The evaporator-absorber means A is preferably a device which employs the Lithium Bromide-Water Cycle absorption principle of operation wherein a housing 25 has an upper evaporator section 26 and a lower absorber section 27, one in open communication with the other.

The evaporator section 26 is primarily associated with evaporation of condenser water discharged by line 21, and is secondarily associated with the chilled water discharge from the sump 19 of refrigeration means R. The circulation pump 20 delivers the chilled water at approximately 52° F. through a heat transfer coil 28 exposed to spray means 29 within chamber section 26 and from which condenser water discharges from line 21 when opened thereto by valve V1. Discharge of chilled water from coil 28 is at a reduced temperature of approximately 44° F. and is useful to condition space through heat transfer coils 30 from which a return line 31 extends to spray means 18 of the refrigeration means R at approximately 54° F., for example. The chilled water spray into section 26 which is not evaporated falls or precipitates by gravity into a collecting tray 32 from which it is drawn by a recirculation pump 23 (when operated).

The absorber section 27 is primarily associated with absorption of heat from the strong absorbent refrigerant discharged by line 11 from the generator means G, and is secondarily associated with heated water circulation from space heating by means of heat transfer coils 33 circulated by pump 22; and is also secondarily associated with heated water discharge through a cooling tower T circulated by a pump 34. The circulation pump 22 delivers the heated water from either the absorber A at approximately 105° F. or from the condenser C at approximately 170° F. and through the heat transfer coils 33 for dissipating heat into the space being conditioned, and subsequently to deliver the heated water at a reduced temperature of approximatley 85°-90° F. through a heat transfer coil 35 exposed within chamber section 27 to spray means 36 from which strong absorbent refrigerant discharges from line 11 of generator means G, and from a sump 37 that collects all liquid that is not evaporated and which falls or precipitates by gravity thereto to be recirculated by a pump 38 to the spray means 36.

Control is by means of valves V1-V8 and related pumps, as will be described. The sump 37 discharges weak absorbent refrigerant through a line 39 controlled by three-way two position recirculating valve V2 that opens direct through pump 40 to the generator means G, or directs flow to the generator means G through a recirculation line 42 that extends through the heat reception side of the condenser means C and through a three-way control valve V3 opened through line 41 and pump 40 in the simultaneous low temperature heating and cooling mode. In practice, the valve V3 is a modulated valve controlled by a temperature sensor and servo means 52 responsive to feed temperature. A three-way two position diverting valve V4 opens recirculation line 42 from sump 37 and valve V2 to the heat reception side of the condenser means C in the simultaneous low temperature heating and cooling mode, and connects the discharge of heat transfer coil 35 to the heat reception side of condenser means C when in all other modes. The heat transfer coils 33 have three-way two position inlet and outlet valves V5 and V6 which divert flow between the coils 33 and pump 22 and/or the cooling tower and pump 34, as will be described. In practice, the valves V5 and V6 are two position controlling valves modulated by a temperature sensor means 53 responsive to space temperature and a controlling servo means 53' that modulates the valves V5 and V6.

The cooling tower T is provided to dissipate heat when operating in the cooling mode, or to share thermal loads in all other modes as required. Tower T comprises a spray means 45 to receive discharge from condenser means C through valve V3 and a three-way two position valve V7. The cooling tower sump 46 has the pump 34 and line that extends valve V6, the position of which is coordinated with the position of valve V7 as will be described.

Heat exchanger H1 is provided to decrease the temperature of the strong absorbent refrigerant that is sprayed by means 36 into the absorber section 27 of means A, and to increase the temperature of the weak absorbent refrigerant feed into the generator means G by pump 40. As shown, a liquid to liquid heat exchanger H1 is employed to transfer the heat out of the strong absorbent discharge of the generator means G, reducing it so as to discharge from spray means 36 at approximately 260° F. when commingled with weak absorbent from the sump 37. This conservation of heat increases the efficiency of generator means G which produces the pressurized motive hot water at approximately 540° F.

Solar heat is collected from solar panels P2 and applied to the weak absorbent feed to the generator means G by means of a heat exchanger H2 provided therefor. The weak absorbent feed can also be circulated directly through the solar panels P2, in either an open or enclosed arrangement (not shown). As shown, a circulating pump 50 draws a liquid heat transfer media through the panels P2 from a liquid-mass storage S and through the exchanger H2. The exchanger is a liquid to liquid device that applies heat to said feed when it is available from the panels P2 and/or from the storage S. Control is by means of a three-way two position valve V8 that discharges heating media liquid through exchanger H2 when it is at a beneficial temperature.

Electrical energy is made available from two sources, solar panels P1 and external (commercial) power lines P. Control means 54 is provided to divide and/or balance the availability of power, it being understood that direct current is applied to the junctions of the thermoelectric still of generator means G as positive and negative potentials.

Referring now to FIG. 1 of the drawings and the simultaneous low temperature heating and cooling mode of operation, the generator means G is energized with D.C. potentials applied to the thermo-electric junctions and thereby produces hot water at 540° F. and 1000 p.s.i. discharging through line 10, and produces hot strong absorbent refrigerant at a commensurate temperature and pressure discharging through line 11. The hot water discharge of generator means G is converted into motive steam by flashing means F, an expansion device, and nozzled through the booster-ejector 15-17 of the steam-jet refrigeration means R which draws chilled water vapor from the evaporation chamber 16 into which chilled water is sprayed by means 18. The steam-vapor mixture is reduced in velocity by the diverging section 17 of the ejector and passed through the condenser means C for heat transfer therefrom into weak absorbent from line 42 and through modulating valve V3 into a recirculation line 41 and through the feed pump 40 that supplies the weak absorbent refrigerant to the generator means G. The steam-vapor mixture discharge is condensed by means C to liquid at lower temperature and directed by valve V1 to the spray means 29 in chamber section 26 of the evaporator of means A where it is evaporated over the chiller coil 28 and/or drops and precipitates into tray 32 for recirculation by pump 23 through said means 29. The chilled water for space conditioning is drawn at said 52° F. from the sump 19 of the steam-jet refrigeration means R by the pump 20 and further chilled to 44° F. in the coil 28 of means A; to be usefully employed by coils 30 in the conditioned space, and returning therefrom to spray means 18 to be recycled. The strong absorbent refrigerant from line 11 of the generator means G is reduced in temperature and pressure by flashing means FS and commingled with weak absorbent from sump 37 and discharged from spray means 36 into the absorber chamber section 27 at approximately 260° F. where the heat of absorption is taken into the heat transfer coil 35 for circulation by pump 22 through valve V5 at 105° F. to be usefully employed by coil 33 in the conditioned space, and returned through valve V6 at 85° F. In this mode, the refrigeration circuit is employed to condition space while the heating circuit is simultaneously employed wither to condition space or to provide a heat source for heating space or by means of a closed circuit by choice heat pump system jointly or separately as circumstances may require. Alternatively, the valves V5 and V6 can be positioned to modulate and dissipate the heat of absorption through the cooling Tower T with operational pump 34.

Referring now to the FIG. 2 of the drawings and the cooling mode of operation, the generator means G, flashing means F, flashing-separator means FS, steam-jet refrigeration means R and evaporator-absorber means A all operate the same as in the mode of FIG. 1. However, the valve V2 is closed to the recirculation line 42, recirculation line 41 is unused, and valve V4 is opened to line 42 from the absorber coil 35 and to the heat reception side of the condenser means C. Significantly, the space heating coils 33 are unused, the valves V5 and V6 being closed thereto and valve V6 and V7 opened through the cooling tower T circuit and valve V3 from the heat reception side of the condenser means C. In this mode, only the refrigeration circuit is usefully employed while the heat of absorption and condenser heat is staged at coils 35 and condenser C and the heat dissipated by the cooling tower T.

Referring now to FIG. 3 of the drawings and the heating mode of operation, the generator means G, flashing means F, flashing separator means FS, and absorber section of means A operate the same as in the modes of both FIGS. 1 and 2. However, the chilled water circulation pump 20 and the evaporator recirculation pump 23 are unused. Valve V1 is closed to spray means 29 and line 21 opened to recirculation pump 38, thereby bypassing the evaporator section 26 of means A. Only the heat of solution is absorbed and taken from heat transfer coil 35 at 105° F. and valve V4 opened to the heat reception side of the condenser means C to stage the heat application (for increase in temperature) to the liquid which is then directed by valves V3, V7 and V5 through pump 22 and the space heating coils 33 at 170° F. to return to coil 35 through valve V6 at 150° F. In this mode, only the heating circuit is usefully employed while the refrigeration circuit remains unused.

Referring now to FIG. 4 of the drawings and the simultaneous high temperature and cooling mode of operation, the generator means G, flashing means F, flashing-separator means FS, steam-jet refrigeration means R and evaporator-absorber means A all operate the same as in the mode of FIG. 1. However, the valves V2, V3 and V4 are positioned as they are in the cooling mode of FIG. 2 while valves V5 and V6, are positioned as they are in the heating mode of FIG. 3 with the sump 22 operated and valve V7 closed to the cooling tower T. Accordingly, the chilled water circuit and heating water circuit both are usefully employed. In this mode the absorber coil 35 and second channel of the condenser C are staged for high heat application to the heat transfer coils 33 in the space being conditioned.

The temperature and pressure valves given herein are for example only and vary in application as determined by design and the load condition.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A space conditioning system for buildings and the like, and including;
    a generator means with feed means and for producing high temperature high pressure motive water separate from an absorbent solution thereof,
    a means converting said motive water into high temperature high pressure steam,
    a steam-jet refrigeration means having a booster ejector operated with said steam and drawing a secondary water vapor from a chamber, there being spray means discharging chilled water into said chamber for both evaporation and precipitation to a sump therein,
    the booster ejector discharging steam through a first channel of a condenser means for liquification and discharge of water through a first diverting valve, and a second channel of the condenser means absorbing heat into a heating water discharged through a control valve,
    an evaporator-absorber means having an evaporator section with spray means for receiving water through said first diverting valve, and having an absorber section with heat transfer coils and with circulating means discharging strong solution from the generator means and through spray means for heat absorption and precipitation of weak solution to a sump therein and returned to said generator means by the feed means therefor, first circulating means for selectively drawing chilled water from the sump of the steam-jet refrigeration means and through coils exposed to the spray means in the evaporator section and thereafter through space cooling coils and recirculated therefrom through the spray means in the chamber of the steam-jet refrigeration means, recirculating means for selectively drawing water from a collecting tray in the evaporator section and discharging the same from the spray means therein, a second diverting valve from the heat transfer coils in the absorber section and discharging between the second channel of the condenser and sump of said absorber section, a recirculating valve from the sump of the absorber section for alternate opening to the generator feed means and to the second channel of the condenser through said second diverting valve, and a pair of controlling valves at the inlet and outlet of a second circulating means through space heating coils and said heat transfer coils in the absorber section.

2. The space conditioning system as set forth in claim 1, wherein the generator means is a Peltier Effect Diffusion Still receiving low pressure weak absorbent solution from said feed means therefor and separately producing said high temperature high pressure motive water and a strong absorbent solution thereof.

3. The space conditioning system as set forth in claim 2, wherein a heat exchanger transfers heat out of the strong absorbent solution produced by the generator means and into the low pressure weak absorbent solution in said feed means thereto.

4. The space conditioning system as set forth in claim 2, wherein a flashing-separator removes steam from the strong absorbent solution produced by the generator means and transfers the steam into the discharge of the booster ejector.

5. The space conditioning system as set forth in claim 2, wherein a heat exchanger transfers heat out of a solar collector means and into the low pressure weak absorbent in said feed means to the generator means.

6. The space conditioning system as set forth in claim 2, wherein the Peltier Effect Diffusion Still is comprised of P and N type thermocouples in an array of shells connected to a direct current power source arranged within a pressure vessel to channel distillate motive water separate from said strong absorbent solution.

7. The space conditioning system as set forth in claim 6, wherein the said direct current power source includes a voltaic solar collector.

8. The space conditioning system as set forth in claim 2, wherein a first heat exchanger transfers heat out of the strong absorbent solution produced by the generator means and into the low pressure weak absorbent solution in said feed means thereof, wherein a second heat exchanger transfers heat out of a solar collector means and into the low pressure weak absorbent in said feed means to the generator means, and wherein a flashing-separator removes steam from the strong absorbent solution produced by the generator means and transfers the steam into the discharge of the booster ejector.

9. The space conditioning system as set forth in claim 2, wherein the Peltier Effect Diffusion Still is comprised of P and N type thermocouples in an array of shells connected to a direct current power source arranged within a pressure vessel to channel distillate motive water separate from said strong absorbent solution, and wherein a first heat exchanger transfers heat out of the strong absorbent solution produced by the generator means and into the low pressure weak absorbent solution in said feed means thereto, wherein a second heat exchanger transfers heat out of a solar collector means and into the low pressure weak absorbent in said feed means to the generator means, and wherein a flashing-separator removes steam from the strong absorbent solution produced by the generator means and transfers the steam into the discharge of the booster ejector.

10. The space conditioning system as set forth in claim 2, wherein the Peltier Effect Diffusion Still is comprised of P and N type thermocouples in an array of shells connected to a direct current power source including a voltaic solar collector and arranged within a pressure vessel to channel distillate water separate from said strong absorbent solution, wherein a first heat exchanger transfers heat out of the strong absorbent solution produced by the generator means and into the low pressure weak absorbent solution in said feed means thereto, wherein a second heat exchanger transfers heat out of a solar collector means and into the low pressure weak absorbent in said feed means to the generator means, and wherein a flashing-separator removes steam from the strong absorbent solution produced by the generator means and transfers the steam into the discharge of the booster ejector.

11. The space conditioning system as set forth in claim 1, wherein the means converting said motive water into steam is a flashing means.

12. The space conditioning system as set forth in claim 1, wherein the control valve for discharge of heating water from the condenser is a modulated valve discharging alternately to the feed means and to the inlet valve and second circulating means in response to servo means with a temperature sensor at the feed means.

13. The space conditioning system as set forth in claim 1, wherein the pair of inlet and outlet valves are modulated valves controlling the second circulating means in response to servo means with a temperature sensor in the space being conditioned.

14. The space conditioning system as set forth in claim 1, wherein the control valve for discharge of heating water from the condenser is open alternately through a third diverting valve to a cooling tower and to the inlet valve of the second circulating means.

15. The space conditioning system as set forth in claim 1, wherein the control valve for discharge of heating water from the condenser is open alternately through a third diverting valve to a cooling tower and to the inlet valve of the second circulating means, said inlet valve being alternately open to the heat transfer coils in the absorber.

16. The space conditioning system as set forth in claim 1, wherein the means converting said motive water into steam is a flashing means, wherein the control valve for discharge of heating water from the condenser is a modulated valve discharging alternately to the feed means and to the inlet valve and second circulating means, wherein the pair of inlet and outlet valves are modulated valves controlling the second circulating means in response to servo means with a temperature sensor in the space being conditioned, and wherein the control valve for discharge of heating water from the condenser is open alternately through a third diverting valve to a cooling tower and to the inlet valve of the second circulating means, said inlet valve being alternately open to the heat transfer coils in the absorber.

17. The space conditioning system as set forth in any one of claims 1,2,8,9,10 and 16 for operating in a Simultaneous Low Temperature Heating and Cooling Mode, wherein the first diverting valve discharges water through the spray means in the evaporator section from the first channel of the condenser, wherein the control valve discharges water to the feed means from the second channel of the condenser, wherein the first circulating means is operated to draw chilled water from the sump of the steam-jet refrigeration means and through the coils exposed to the spray means in the evaporator section and thereafter through the space cooling coils and recirculated therefrom through the spray means in the steam-jet refrigeration means, wherein the recirculating means is operated to draw water from the collecting tray in the evaporator section and to discharge the same from the spray means therein, wherein the second diverting valve is open from the heat transfer coils in the absorber section to the second channel of the condenser and the recirculating valve open therefrom to the feed means, and wherein the pair of controlling valves at the inlet and outlet are open through the space heating coils and the second circulating means operated.

18. The space conditioning system as set forth in any one of claims 1,2,8,9,10 and 16 for operating in a Cooling Mode, wherein the first diverting valve discharges water through the spray menas in the evaporator section from the first channel of the condenser, wherein the second diverting valve is open from the heat transfer coils in the absorber section to the second channel of the condenser, wherein the control valve discharges water from the second channel of the condenser to a third diverting valve and to a cooling tower and therefrom to the inlet valve of the third circulating means, wherein the outlet valve of said pair of controlling valves is opened from the third circulating means from the colling tower and to the heat transfer coils in the absorber section, and wherein the recirculating valve is open from the sump of the absorber section and to the feed means.

19. The space conditioning system as set forth in any one of claims 1,2,8,9,10 and 16 for operating in a Heating Mode, wherein the first diverting valve discharges water from the first channel of the condenser and into the circulating means discharging strong solution through the spray means into the absorber section, wherein the second diverting valve is open from the heat transfer coils in the absorber section to the second channel of the condenser, wherein the control valve discharges water from the second channel of the condenser through a third diverting valve and to the inlet valve of said pair of controlling valves opened through the second circulating means and to the space heating coils, wherein the outlet valve of said pair of controlling valves is opened to the heat transfer coils in the absorber section, and wherein the recirculating valve is open from the sump of the absorber section and to the feed means.

20. The space conditioning system as set forth in any one of claims 1,2,8, 9, 10 and 16 for operating in a Simultaneous High Temperature Heating and Cooling Mode, wherein the first diverting valve discharges water through the spray means in the evaporator section from the first channel of the condenser, wherein the second diverting valve is open from the heat transfer coils in the absorber section to the second channel of the condenser, wherein the control valve discharges water from the second channel of the condenser through a third diverting valve and to the inlet valve of said pair of controlling valves opened through the second circulating means and to the space heating coils, wherein the outlet valve of said pair of controlling valves is opened to the heat transfer coils in the absorber section, and wherein the recirculating valve is open from the sump of the absorber section and to the feed means.

* * * * *